United States Patent [19]

Hornung

[11] 4,035,787
[45] July 12, 1977

[54] FOOD TEMPERATURE RESPONSIVE CONTROL APPARATUS

[75] Inventor: Richard E. Hornung, Louisville, Ky.

[73] Assignee: General Electric Company, Louisville, Ky.

[21] Appl. No.: 624,336

[22] Filed: Oct. 21, 1975

[51] Int. Cl.² .................. G08B 19/00; G08B 29/00
[52] U.S. Cl. ..................... 340/228 R; 73/362 AR; 126/273 R; 324/65 P; 340/409
[58] Field of Search .......... 340/228 R, 213 Q, 409; 126/19 R, 273 R; 73/362 AR, 343 R; 324/65 P; 307/141.4, 141

[56] References Cited
U.S. PATENT DOCUMENTS

| 2,510,526 | 6/1950 | Smith | 340/228 R |
| 3,201,991 | 8/1965 | Mansberg | 340/228 R |
| 3,581,300 | 5/1971 | Eloranta | 340/309.1 |
| 3,611,336 | 10/1971 | Chen | 340/233 |
| 3,667,476 | 6/1972 | Muller | 128/399 |
| 3,671,817 | 6/1972 | Seipp | 307/141 |
| 3,767,937 | 10/1973 | Schmidgall | 307/141 |
| 3,806,921 | 4/1974 | Pappas | 340/412 |
| 3,859,644 | 1/1975 | Main | 340/228 R |
| 3,883,753 | 5/1975 | Harrison, Jr. et al. | 340/228 R |

Primary Examiner—Glen R. Swann, III
Attorney, Agent, or Firm—Steven C. Schnedler; Francis H. Boos

[57] ABSTRACT

Food temperature responsive apparatus for controlling an oven. The apparatus includes a temperature sensing thermistor which may be included in a probe adapted for insertion into food being cooked in an oven. The apparatus includes simplified and effective means, in the form of voltage dividers and comparators, for performing the functions of de-energizing the oven heating means and energizing an audible alarm when interior food temperature reaches a preset temperature, protecting against an open-circuited or a short-circuited condition in a sensing circuit which includes the thermistor, guarding against responding to transient electrical noise, and latching the oven heating means in a de-energized condition once it has been de-energized. Even though the thermistor has a non-linear resistance versus temperature characteristic, the apparatus provides a linear temperature presetting scale and includes a linear temperature presetting potentiometer.

12 Claims, 6 Drawing Figures

FOOD TEMPERATURE RESPONSIVE CONTROL APPARATUS

BACKGROUND OF THE INVENTION

1. Field of the Invention

The present invention relates to food temperature responsive control apparatus. More particularly, the invention relates to oven control apparatus including a temperature-sensing thermistor which may be included in a probe adapted for insertion into food being cooked in either a conventional or a microwave oven.

2. Description of the Prior Art

Prior art temperature monitoring devices, such as that disclosed in U.S. Pat. No. 3,815,114 — Welch, assigned to the same assignee as the present invention, have provided for sounding an audible alarm or for de-energizing a heating means in an oven when food temperature, as sensed by a thermistor included in a probe inserted into the food, reaches a preset temperature. As used herein, "heating means" refers either to a resistance heater or a gas burner as in a conventional oven, or to a source of microwave energy, as in a microwave oven. Certain of the prior art temperature monitoring devices include means for performing various of the following functions in addition to means for performing the function of producing a signal for sounding an alarm or de-energizing a heating means; protecting against an open-circuited or a short-circuited condition in a circuit including the thermistor, guarding against responding to transient electrical noise and prematurely causing the heating means to be de-energized in response thereto, and latching the heating means in a de-energized condition, until manually reset, once the heating means has been de-energized. However, no prior art device combines all these functions in a simple and effective manner. Additionally, some of the prior art devices, if the thermistor has a non-linear temperature versus voltage characteristic and a linear temperature presetting scale is desired, require that either a non-linear potentiometer or a nonlinear temperature presetting scale be included in a temperature presetting means.

SUMMARY OF THE INVENTION

It is an object of the invention to provide simplified, effective and straightforward food temperature responsive control apparatus which includes means to perform all of the above-mentioned functions.

It is another object of the invention to provide such apparatus in which a thermistor having a non-linear temperature versus voltage characteristic is used and, at the same time, in which a temperature presetting means includes a linear temperature presetting scale and employs a linear potentiometer.

Preferably, the apparatus of the present invention includes a temperature-sensing thermistor included in a probe adapted for insertion into food being cooked. For example, a probe adapted for use in a microwave oven, such as one of the probes disclosed in either application Ser. No. 616,049, filed Sept. 23, 1975, by David Y. Chen and Louis H. Fitzmayer, and entitled "Food Thermometer for Microwave Oven," now U.S. Pat. No. 3,975,720, issued Aug. 17, 1976; or application Ser. No. 616,050, filed Sept. 23, 1975, by Louis H. Fitzmayer, and entitled "Food Thermometer for Microwave Oven," now U.S. Pat. No. 3,974,696, issued Aug. 17, 1976; both applications assigned to the same assignee as the present invention, may be employed. Alternatively, a probe adapted for use in a conventional oven, such as is disclosed in the abovementioned U.S. Pat. No. 3,815,113—Welch, may be employed.

The apparatus of the invention includes a means responsive to sensed food temperature for producing a first signal when food temperature reaches a preset temperature, which means, in one embodiment thereof, includes a temperature responsive voltage divider for producing a voltage representative of sensed temperature, a temperature presetting means comprising a first reference voltage divider for producing a first reference voltage representative of the preset temperature, and a voltage comparator for producing the first signal when the voltage representative of sensed temperature exceeds the first reference voltage. The value of a resistor included in the temperature responsive voltage divider is selected so that the temperature responsive voltage divider has a non-linear voltage versus resistance characteristic which complements the non-linear resistance versus temperature characteristic of the thermistor in order to produce an overall linear voltage versus temperature characteristic when the thermistor is included in the temperature responsive voltage divider.

The apparatus also includes protection against either open-circuited or short-circuited conditions in the sensing circuit. This protection relies upon there being an expected range of possible sensed temperatures, for example, from 32° to 200° F., inclusive. Food at a temperature below 32° F. would presumably be frozen and a probe could not be inserted. It is not expected that food would be cooked to internal temperatures of higher than 200° F. If either an open-circuited or short-circuited condition were to exist in the sensing circuit, then the apparent sensed temperature would fall outside the expected range of possible sensed temperature. The apparatus according to the invention includes means for de-energizing the heating means when the temperature sensed by the thermistor falls outside the expected range, thereby providing the required protection.

The means responsive to sensed food temperature, when a thermistor having a negative temperature coefficient is employed, inherently provides protection against a short-circuited condition in the sensing circuit. A short circuit in parallel with the thermistor will appear to be a very high sensed temperature, above the expected range of sensed temperatures, and will result in a signal to de-energize the heating element being produced.

A separate means for producing a second signal to de-energize the heating means when an open-circuited condition exists in the sensing circuit is included in the apparatus of the present invention. This means, in one embodiment thereof, includes a means for sensing the voltage produced by the temperature responsive voltage divider and a voltage comparator for comparing the voltage produced by the temperature responsive voltage divider to a second reference voltage. The second reference voltage is representative of a temperature lower than the lowest initial temperature of food to be placed in the oven, a temperature below the expected range of sensed temperature. The second signal to de-energize the heating element is produced by the comparator when the voltage produced by the temperature responsive voltage divider is less than the second reference voltage.

In order to guard against the apparatus falsely responding to transient noise and prematurely de-energizing the heating mens, the apparatus includes a means which allows de-energization of the heating element only when the first signal has been received for a predetermined amount of time. This means, in one embodiment thereof, includes a resistor-capacitor integrating network and a voltage comparator to compare the voltage across the capacitor with a third reference voltage. A third signal to de-energize the heating means is produced by the comparator when the voltage across the capacitor exceeds the third reference voltage.

A latching means is included which, according to one embodiment thereof, includes a comparator for producing a feedback signal to hold the heating means in a de-energized condition in response to the production of an initial signal to de-energize the heating means.

Apparatus according to the present invention has particular utility when used to control a microwave oven because, in a microwave oven, heat is produced within the food by direct action of the microwave energy and additional heating of the food caused by continued energy input stops immediately when the source of microwave energy is deenergized. (However, even after the source of microwave energy is de-energized, there is a period of time when heat tends to distribute itself evenly throughout the food. During this period, cooking of cooler regions of the food continues due to heat flowing from adjacent warmer regions). This is in contrast to a conventional oven in which the entire interior of the cooking cavity is hot and in which actual external heating of the food continues, although at a continually decreasing rate, even after the heating means is de-energized.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
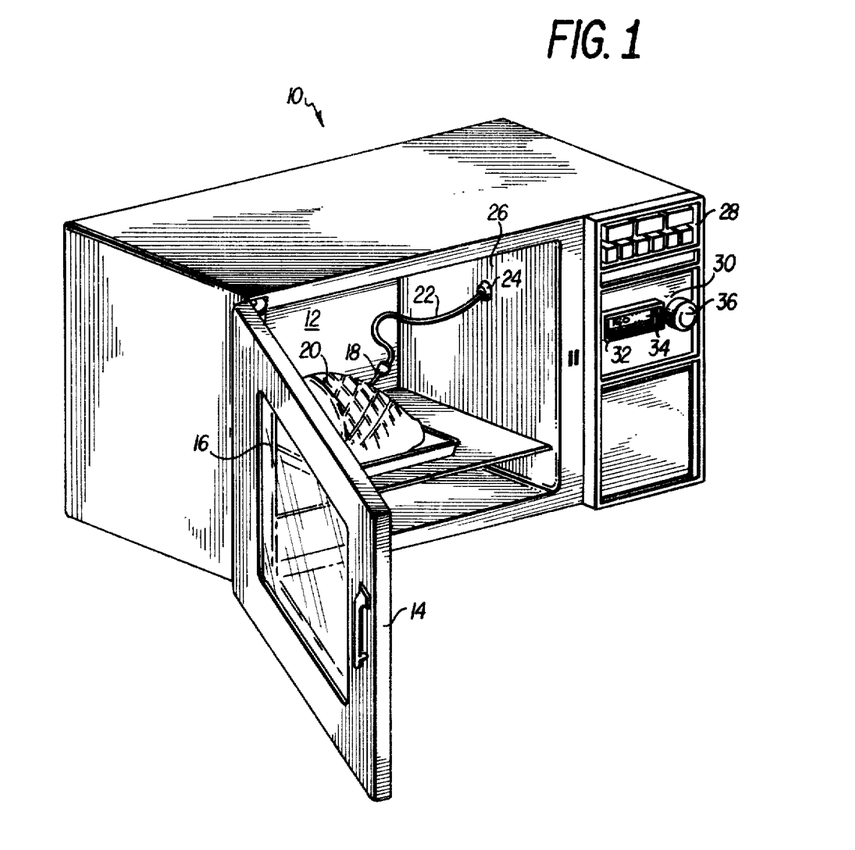
FIG. 1 is a front perspective view of a countertop microwave oven including food temperature responsive control apparatus according to the present invention.

Referring first to FIG. 1, there is shown, for illustrative purposes, a countertop microwave oven 10 including control apparatus according to the present invention. It will be recognized by those skilled in the art that the present invention is applicable as well to a conventional oven, either electrically or gas heated. The oven 10 is of conventional construction having a cooking cavity 12 and a door 14 which includes a window 16. The oven 10 also includes a heating means (not shown) such as a magnetron for producing microwave energy, as in a microwave oven, or an electrical resistance heater or a gas burner, as in a conventional oven.

The oven 10 includes a temperature sensing probe 18 inserted into food, such as a ham 20, which is to be cooked to an internal temperature of, for example, 160° F. The probe 18 is electrically connected through a shielded cable 22 and a connector 24 mounted on an interior wall 26 of the cooking cavity 12 to circuitry embodying the present invention. The probe 18 is adapted for use in a microwave oven and may be one of the probes disclosed in either of the above-mentioned U.S. Pat. Nos. 3,975,720— Chen and Fitzmayer, or 3,974,696— Fitzmayer. Alternatively, if the present invention were employed with a conventional oven, a probe adapted for use in a conventional oven such as is disclosed in the above-mentioned U.S. Pat. No. 3,815,113—Welch, could be employed.

The oven 10 includes a control panel 28 in which is mounted a control assembly 30. Included in the control assembly 30 is a temperature presetting means having a movable temperature presetting scale 32 with linear graduations, a fixed indicator 34, and a rotatable control knob 36. In addition to being adapted to move the temperature presetting scale 32, the control knob 36 is mechanically coupled to control the position of a movable wiper 38 (shown in FIG. 2) of a linear temperature-presetting potentiometer 40 (shown in FIGS. 2 and 6).

Figure 2:
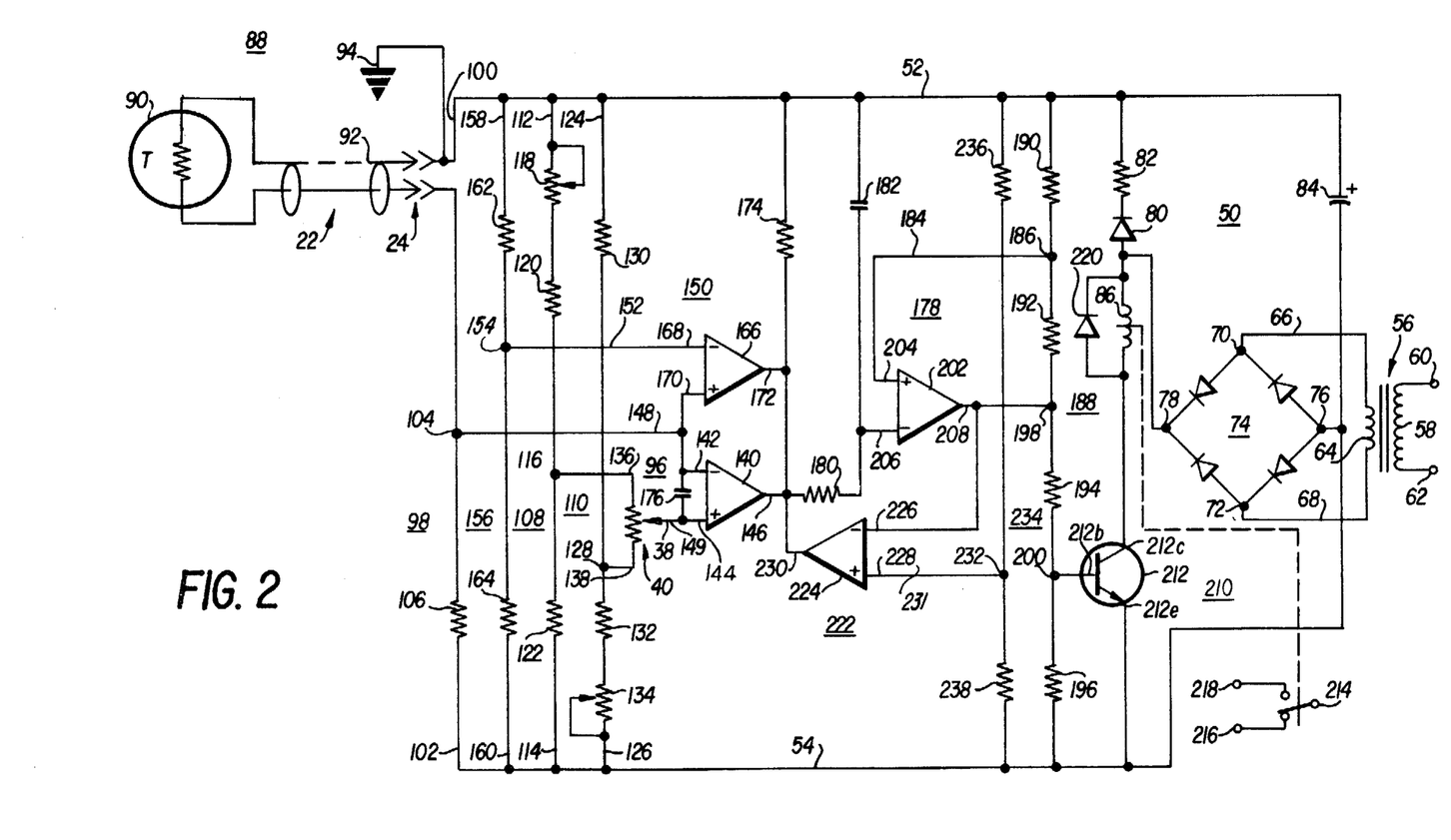
FIG. 2 is a schematic circuit diagram of apparatus according to the present invention.

Referring now to FIG. 2, there is shown a detailed schematic diagram of apparatus according to a preferred embodiment of the invention. A power supply, generally designated at 50, is included to produce a voltage across positive and negative DC supply conductors 52 and 54. Although the negative DC supply conductor 54 is not grounded, for convenience in describing the circuit of FIG. 2 and explaining the operation thereof, all voltages are referenced to the negative DC supply conductor 54. The power supply 50 includes a power transformer 56 having a primary winding 58 with terminals 60 and 62 for connection to a source of AC voltage, for example, a household power line supplying 120 volt, 60 cycle AC (not shown). In order to control the application of AC power to the primary winding 58, a switch (not shown) or a relay contact (not shown) is interposed between the source of AC power and the terminals 60 and 62. In order to convert the low voltage AC produced by a secondary winding 64 of the transformer 56 to DC, the winding 64 is connected through conductors 66 and 68 to the AC input terminals 70 and 72 of a conventional diode bridge rectifier 74. The negative DC output terminal 76 of the rectifier bridge 74 is connected to the negative DC supply conductor 54 and the positive DC output terminal 78 of the bridge 74 is connected through a series combination of an isolation diode 80 and a dropping resistor 82 to the positive DC supply conductor 52. The isolation diode 80 is polarized with its anode connected to the positive bridge output terminal 78. The power supply 50 additionally includes a filter capacitor 84 connected between the positive and negative DC supply conductors 52 and 54. In order to supply higher voltage and current to a relay coil 86 than is supplied to the rest of the circuitry and to avoid loading the filter capacitor 84 when the relay coil 86 is energized, one terminal of the relay coil 86 is connected directly to the positive terminal 78 so that current to the relay coil 86 does not flow through the isolation diode 80.

A temperature-sensing circuit, generally designated at 88, includes a negative temperature coefficient thermistor 90 which is included in the probe 18 (shown in FIG. 1) and electrically connected to the rest of the circuitry through the shielded cable 22 and the connector 24. The outer conductor 92 of the shielded cable 22 is connected to ground potential through a ground connection 94. In order to accommodate the outer conductor 92 being grounded, the circuitry is arranged so that the positive DC supply conductor 52 is also grounded. However, as stated above, for convenience of explanation all voltages are referenced to the negative DC supply conductor 54.

In order to produce a first signal when the temperature sensed by the thermistor 90 exceeds a preset temperature, a first signal-producing means, generally designated at 96, is provided and is connected to the temperature sensing circuit 88. The first signal producing means 96 includes a temperature responsive voltage divider, generally designated at 98, having terminals 100 and 102 connected to the positive and negative DC supply conductors 52 and 54 and additionally having an intermediate tap point 104 at which a first voltage is developed, the first voltage being representative of and an approximately linear function of sensed temperature. The sensing circuit 88, including the thermistor 90, is electrically connected, through the shielded cable 22 and the connector 24, between the terminal 100 and the tap point 104 so as to be electrically included in the temperature responsive voltage divider 98. A fixed resistor 106 is connected between the tap point 104 and the terminal 102.

In order to compensate for the non-linear resistance versus temperature characteristic of the thermistor 90 so that the first voltage developed at the tap point 104 is an approximately linear direct function of the temperature sensed by the thermistor 90 over an operating range of 90° to 200° F., the resistance of the resistor 106 is selected to be a particular value. The manner in which the value of the resistor 106 is selected will be better understood after consideration of the characteristic curves graphically illustrated in FIGS. 3, 4 and 5.

Figure 3:
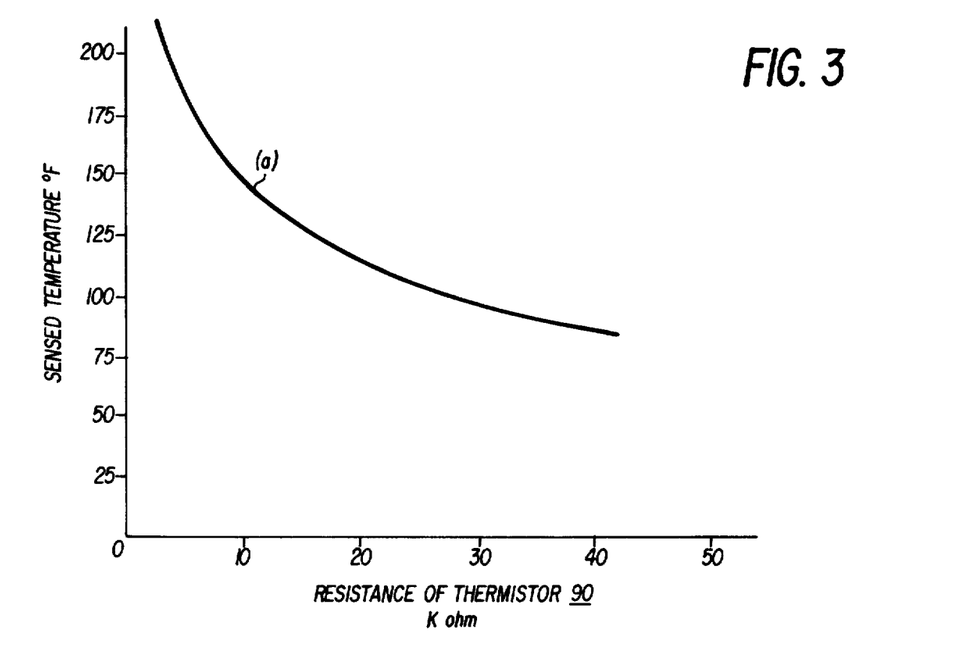
FIG. 3 graphically illustrates the resistance versus temperature characteristic of a temperature sensing thermistor included in the embodiment of the invention shown in FIG. 2.

Referring to FIG. 3, the resistance versus temperature characteristic of the thermistor 90 is represented by the characteristic curve (a). As shown, the resistance of the thermistor 90 is a non-linear inverse function of sensed temperature. Commonly-available thermistors have characteristic curves with the same general shape, although their temperature ranges, resistance ranges, and scale factors may vary.

Figure 4:
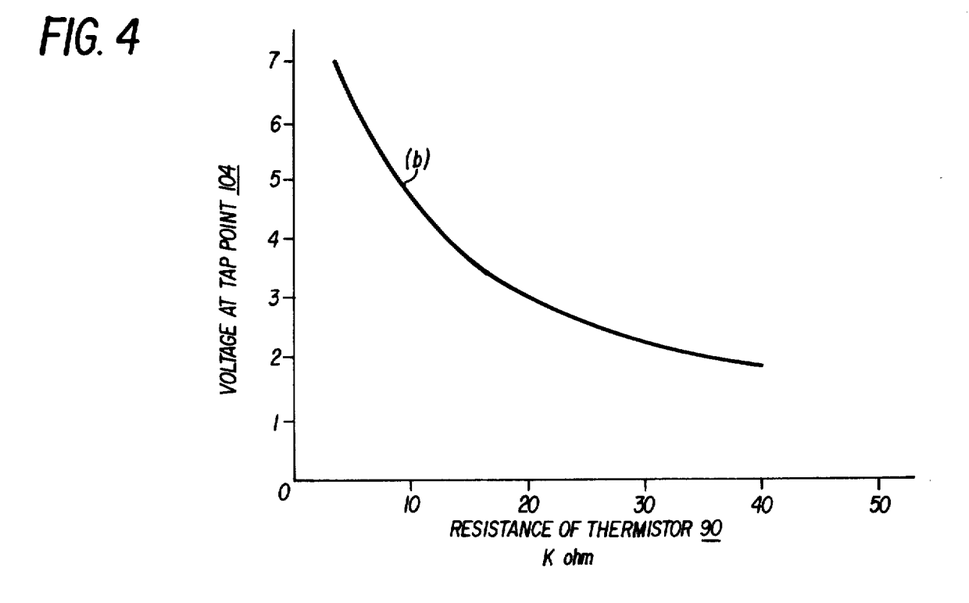
FIG. 4 graphically illustrates the output voltage versus resistance characteristic of a temperature responsive voltage divider included in the embodiment of the invention shown in FIG. 2.

Referring to FIG. 4, the output voltage versus thermistor resistance characteristic of the temperature responsive voltage divider 98 is represented by the characteristic curve (b). In order for the voltage divider characteristic to be as represented by the curve (b), conditions are defined as follows: Resistor 106 is selected, in a manner which will hereinafter be explained, to have a resistance value of 8.4 K ohms; the voltage across the terminals 100 and 102 is 10 volts, the terminal 102 (connected to the negative DC supply conductor 54) being the reference terminal for the purpose of voltage measurements; and output voltage of the voltage divider 98 is measured at the tap point 104. It will be apparent that:

$$V_o = (10 \text{ volts}) \left( \frac{R_{106}}{R_{106} + R_{T90}} \right) \quad (1)$$

where $V_o$ is the output voltage of the voltage divider 98,
$R_{106}$ is the resistance of the resistor 106, and
$R_{T90}$ is the resistance of the thermistor 90 as represented by the curve (a) (FIG. 3).

As shown in FIG. 4, the output voltage of the voltage divider 98, and thus the voltage at the tap point 104, is a non-linear inverse function of the resistance of the thermistor 90.

Figure 5:
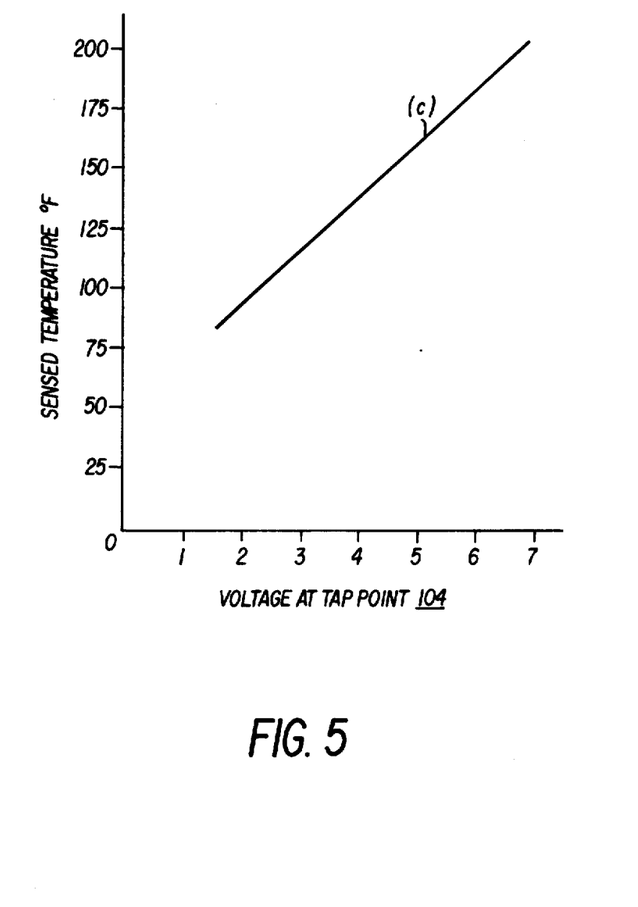
FIG. 5 graphically illustrates the output voltage versus sensed temperature characteristic of the temperature responsive voltage divider included in the embodiment of the invention shown in FIG. 2.

Referring to FIG. 5, the composite characteristic produced when the curves (a) (FIG. 3) and (b) (FIG. 4) are effectively combined by including the thermistor 90 in the temperature responsive voltage divider 98 is represented by the characteristic curve (c). Since the abscissas of both FIG. 3 and FIG. 4 represent "resistance of thermistor 90," for each value of "sensed temperature" along the ordinate of FIG. 3, there is a corresponding "voltage at the tap point 104" on the ordinate of FIG. 4. For example, for a sensed temperature of 145° F, from FIG. 3 it can be determined that the resistance of thermistor 90 is 11.19 K ohm. Then, from FIG. 4, it can be determined that the voltage at the tap point 104 is 4.2 volts. This establishes one of the points along the curve (c) of FIG. 5. As shown by FIG. 5, the output voltage of the voltage divider 98 (the voltage produced at the tap point 104) is an approximately linear direct function of the temperature as sensed by the thermistor 90 over the operating temperature range. Thus, compensation for the non-linear characteristic of the thermistor 90 is provided.

One procedure for selecting the value of the resistor 106 will now be explained. First, three temperature points within the operating temperature range are arbitrarily selected and designated $T_1$, $T_2$ and $T_3$ (not shown). For example, $T_1 = 90°$ F., $T_2 = 145°$ F., and $T_3 = 200°$ F. The temperature points $T_1$, $T_2$ and $T_3$ are increasing temperatures, i.e., $T_1 < T_2 < T_3$, and $T_2$ is midway between $T_1$ and $T_3$, i.e., $T_2 - T_1 = T_3 - T_2$.

Second, the characteristic curve (a) (FIG. 3) is used to determine corresponding thermistor resistance values, designated $R_1$, $R_2$ and $R_3$, for the temperature points $T_1$, $T_2$ and $T_3$. From FIG. 3, $R_1 = 36.50$ K ohm, $R_2 = 11.19$ K ohm, and $R_3 = 4.18$ K. ohm.

Third, the corresponding output voltages of the voltage divider 98 (produced at the tap point 104) for the thermistor resistance values $R_1$, $R_2$ and $R_3$ are designated $V_1$, $V_2$ and $V_3$. Since the characteristic curve (c) (FIG. 5) is to be linear through at least the selected points, $V_2$ must be midway between $V_1$ and $V_3$. Thus, $$V_2 = \frac{V_1 + V_3}{2} \quad (2)$$

From equation (1) it will be apparent that:

$$V_1 = V \frac{R_{106}}{R_{106} + R_1} \quad (3)$$

-continued $$V_2 = V \frac{R_{106}}{R_{106} + R_2}, \text{ and} \quad (4)$$

$$V_3 = V \frac{R_{106}}{R_{106} + R_3}. \quad (5)$$

where $V$ is the voltage across the terminals 100 and 102.

Equations (2), (3), (4) and (5) are simultaneously solved for $R_{106}$:

$$R_{106} = \frac{R_1 R_2 + R_2 R_3 - 2R_1 R_3}{R_1 + R_3 - 2R_2} \quad (6)$$

Substituting the numerical values for $R_1$, $R_2$, and $R_3$ into equation (6) yields $$R_{106} = 8.4 \text{ K ohm}.$$

It will be apparent that other methods, including trial and error, could be employed to select the value of the resistor 106. The particular method described above is exemplary only and is not intended to limit the scope of the claimed invention.

Returning to FIG. 2, the first signal-producing means 96 also includes a means for developing a first reference voltage representative of the preset temperature. The means for developing the first reference voltage includes a high-end calibration voltage divider, generally designated at 108, a low-end calibration voltage divider, generally designated at 110, and the potentiometer 40. The high-end calibration voltage divider 108 includes terminals 112 and 114 connected to the positive and negative DC supply conductors 52 and 54 and further includes an intermediate tap point 116. A variable calibration resistor 118 and a fixed resistor 120 are serially connected between the terminal 112 and the tap point 116 and a fixed resistor 122 is connected between the tap point 116 and the terminal 114.

The low-end calibration voltage divider 110 includes terminals 124 and 126 connected to the positive end and negative DC supply conductors 52 and 54 and further includes an intermediate tap point 128. A fixed resistor 130 is connected between the terminal 124 and the tap point 128 and a fixed resistor 132 and a variable calibration resistor 134 are serially connected between the tap point 128 and the terminal 126. The high-end terminal 136 of the temperature presetting potentiometer 40 is connected to the tap point 116 of the high-end calibration voltage divider 108 and the low-end terminal 138 of the temperature presetting potentiometer 40 is connected to the tap point 128 of the low-end calibration voltage divider 110.

The first signal-producing means 96 additionally includes a comparator 140 having an inverting input 142, a non-inverting input 144 and an output 146. The comparator 140 is conventional and is of the type having an output which is the uncommitted collector of an internal grounded-emitter NPN output transistor (not shown), also known as "open collector" output. The comparator 140 has conventional positive and negative supply voltage terminals (not shown) which, in order to supply power to the comparator 140, are connected in a well known manner to the positive and negative DC supply conductors 52 and 54. Preferably, the comparator 140 is included in a commercially-available "quad comparator" integrated circuit package such as a Motorola MC3302 or a National Semiconductor LM3302.

The emitter of the internal NPN output transistor is internally connected to the comparator negative supply voltage terminal, and thus to the negative supply voltage conductor 54. The collector of the internal output transistor is internally connected to the output 146. The base of the internal output transistor is connected to other circuitry within the comparator 140. the characteristics of the comparator 140 are such that when the voltage supplied to the inverting input 142 is more positive than the voltage supplied to the non-inverting input 144, the internal output transistor turns on, thereby effectively connecting the output 146 to the negative DC supply conductor 54. This will hereinafter be referred to as the comparator "on" condition. On the other hand, when the voltage supplied to the inverting input 142 is less positive than the voltage supplied to the non-inverting input 144, the internal output transistor turns off and the output 146 draws no current or "floats." This will hereinafter be referred to as the comparator "off" condition. Selection of an "open collector" output comparator permits the outputs of a number of comparators to be directly connected together to provide an output "wired OR" function.

In order to turn the comparator 140 on and thus to provide a signal at the output 146 when the temperature sensed by the thermistor 90 exceeds the preset temperature determined by the position of the temperature presetting potentiometer wiper 38, the inverting input 142 is connected through a conductor 148 to the tap point 104 of the temperature responsive voltage divider 98 and the non-inverting input 144 is connected through a conductor 149 to the wiper 38.

In order to produce a second signal when an open-circuited condition exists in the sensing circuit 88, a second signal-producting means, generally designated at 150, is provided. The second signal-producing means 150 includes a connection through a conductor 152 to the tap point 154 of a second reference voltage divider, generally designated at 156, for producing a second reference voltage. The second reference voltage is less than a voltage representative of a temperature lower than the lowest initial temperature of food to be placed in the oven. In addition to the tap point 154, the second reference voltage divider 156 includes terminals 158 and 160 connected to the positive and negative DC supply conductors 52 and 54 and further includes a resistor 162 connected between the terminal 158 and the tap point 154 and a resistor 164 connected between the tap point 154 and the terminal 160.

The second signal-producing means 150 also includes a comparator 166 having an inverting input 168, a non-inverting input 170, and an output 172. The comparator 166 is electrically identical to the comparator 140 which was described above and is preferably contained within the same integrated circuit pckage. In order to turn the comparator 166 on and thus to provide a signal at the output 172 when the voltage representative of sensed temperature at the tap point 104 is less positive than the second reference voltage, thereby indicating that an open-circuited condition exists in the temperature sensing circuit 88, the inverting input 168 is connected through the conductor 152 to the tap point 154 on the second reference voltage divider 156 and the non-inverting input 170 is connected through the conductor 148 to the tap point 104 on the temperature responsive voltage divider 98. As previously described, the voltage developed at the tap point 104 is the first voltage; thus the connection to the tap point 104 is a means for sensing the first voltage.

The open collector comparator outputs 146 and 172 are connected to each other and are connected through a pull-up resistor 174 to the positive DC supply conductor 52. It will be apparent to those skilled in the art that similar results could be obtained if the comparators 140 and 166 were of the active pull-up and pull-down type, rather than being of the open collector type with only active pull-down, and if blocking diodes with common anodes were connected between each of the outputs 146 and 172 and the common connection point of the outputs 146 and 172.

In order to provide protection against transient noise, a capacitor 176 is connected between the inverting input 142 and the non-inverting input 144 of the comparator 140. The capacitor 176 provides noise protection by providing a very low impedance to high frequency voltages and by utilizing the common mode rejection inherent in the comparator 140.

In order to guard against the apparatus falsely responding to large noise spikes which may still momentarily turn the comparator 142 on despite protection provided by the capacitor 176, a third signal-producing means, generally designated at 178, is included. A third signal is produced only when the comparator 140 has been on for a predetermined amount of time. The third signal-producing signal means 178 includes an integrating network comprising a resistor 180 and a capacitor 182, one terminal of the resistor 180 being connected to to one terminal of the capacitor 182. The other terminal of the resistor 180 is connected to the comparator outputs 146 and 172 and the other terminal of the capacitor 182 is connected to the positive DC supply conductor 52. The capacitor 182 discharges through the resistors 174 and 180 when the comparators 140 and 166 are both off, and charges through the resistor 180 and the collector-emitter junction of the internal comparator output transistor when either of the comparators 140 or 166 is on. The third signal-producing means 178 also includes a connection through a conductor 184 to a tap point 186 of a voltage divider, generally designated at 188, the tap point 186 being a source of a third reference voltage which is intermediate the voltage on the capacitor 182 when the capacitor 182 is discharged and the voltage on the capacitor 182 when the capacitor 182 is charged. The voltage divider 188 comprises serially-connected fixed resistors 190, 192, 194 and 196, one terminal of the resistor 190 being connected to the positive DC supply conductor 52 and one terminal of the resistor 196 being connected to the negative DC supply conductor 54. The voltage divider 188 further comprises a tap point 198 at the junction of the resistors 192 and 194 and a tap point 200 at the junction of the resistors 194 and 196, in addition to the tap point 186 at the junction of the resistors 190 and 192.

The third signal producing means 178 includes a comparator 202 having a non-inverting input 294, an inverting input 206, and an output 208. The comparator 202 is electrically identical to the comparator 140 which was described above and preferably is contained within the same integrated circuit package. In order to determine the state of charge of the capacitor 182 and to produce a signal when the capacitor 182 is sufficiently charged, the inverting input 206 is connected to the junction of the capacitor 182 and the resistor 180 and the non-inverting input 204 is connected through the conductor 184 to the tap point 186. The comparator output 208 is connected to the tap point 198 of the voltage divider 188. As will be more apparent when the operation of the preferred embodiment is explained, below, the comparator 202 is connected as a Schmitt trigger.

An output signal from the comparator 202 is represented by the comparator off condition. This is in contrast to the comparators 140 and 166 in which an output signal is represented by the comparator on condition.

The apparatus also includes an output switching means, generally designated at 210, for de-energizing the heating means and for energizing an indicator (not shown), preferably an audible indicator, in response to the third signal. The output switching means 210 comprises an NPN amplifying transistor 212 connected in a common emitter configuration with the base 212b connected to the tap point 200 so as to receive base drive and to turn the transistor 212 on when the comparator 202 in the third signal-producing means 178 is in the off state (third signal present). The emitter 212e is connected to the negative DC supply conductor 54 and the collector 212c is connected to the other terminal of the relay coil 86. In addition to the coil 86, the relay includes a common contact terminal 214, a normally-closed contact terminal 216 and a normally-open contact terminal 218. In order to prevent inductive kick-back produced by the relay coil 86 from destroying the transistor 212 and to minimize chattering due to the pulsating DC produced by the rectifier bridge 74, a diode 200 is connected in parallel with the relay coil 86, the diode 220 being polarized with the anode connected to the collector 212c. The output switching means 210 is defined to be in a first condition when the transistor 212 is off and the relay coil 86 is not energized, and to be in a second condition when the transistor 212 is on and the relay coil 86 is energized.

An energizing circuit (not shown) for the heating means includes the common contact terminal 214 and the normally-closed contact terminal 216 so that the heating means can only be energized when the transistor 212 is off and the relay coil 86 is not energized. An energizing circuit (not shown) for the audible indicator includes the common contact terminal 214 and the normally-open contact terminal 218 so that the audible indicator is energized when the output transistor 212 is on and the relay coil 86 is energized.

In order to hold the output switching means 210 in the second condition, and thus to hold the heating means in a de-energized condition, once the output switching means 210 has initially been placed in the second condition, a latching means, generally designated at 222, is included. The latching means 222 comprises a comparator 224 having an inverting input 226, a non-inverting input 228 and an output 230. The comparator 224 is also electrically identical to the comparator 140. Like the comparators 140 and 166, an output signal from the comparator 222 is represented by the comparator on condition. In order to produce a latching feedback signal when drive is supplied to the base 212b, the inverting input 226 is connected to the output 208 of the comparator 202 and the non-inverting input 228 is connected through a conductor 231 to a source of a fourth reference voltage. Since, as previously described, the comparator output 208 is connected to the input of the output switching means 210, the connection to the comparator output 208 is a means for the latching means 222 to sense the voltage supplied to the output switching means 210. The fourth reference voltage is greater than the voltage required at the output 208 to turn the transistor 212 off and less than the voltage required at the output 208 to turn the transistor 212 on and is produced at a tap point 232 on a fourth reference voltage divider, generally designated at 234. The fourth reference voltage divider 234 comprises a fixed resistor 236 connected between the positive DC supply conductor 52 and the tap point 232 and a fixed resistor 238 connected between the tap point 232 and the negative DC supply conductor 54. In order to complete the latching feedback loop, the output 230 is connected in parallel with the outputs 146 and 172 of the comparators 140 and 166 to the input of the third signal-producing means 178.

The following component values have been found suitable for use in the circuit shown in FIG. 2. These values are exemplary only, and are not intended to limit the scope of the claimed invention.

| Thermistor | |
|---|---|
| 90 NL Industries Type 1H-503, 50 K ohms at 25° C. | |
| Fixed Resistors | |
| 82 | 22 ohm |
| 106 | 8.4 K ohm |
| 120 | 270 ohm |
| 122 | 1.5 K ohm |
| 130 | 1.6 K ohm |
| 132 | 200 ohm |
| 162 | 200 K ohm |
| 164 | 5.1 K ohm |
| 174 | 560 K ohm |
| 180 | 30 K ohm |
| 190 | 2 K ohm |
| 192 | 1 K ohm |
| 194 | 2 K ohm |
| 196 | 2 K ohm |
| 236 | 51 K ohm |
| 238 | 10 K ohm |
| Variable Resistors | |
| 118 | 750 ohm |
| 134 | 750 ohm |
| Potentiometer | |
| 40 | 10 K ohm, linear |
| Capacitors | |
| 176 | 0.01 mfd. |
| 182 | 3.9 mfd. |
| Diodes | |
| 74 | 4-1N914 |
| 80 | 1N914 |
| 220 | 1N914 |
| Transistor | |
| 212 | 2N5810 |
| Relay | |
| | 12 VDC coil |
| Transformer | |
| 56 | 12 VAC secondary |
| Comparators | |
| 140, 166, 202, 224 | All included in a single Motorola MC3302 Integrated Circuit. |

Figure 6:
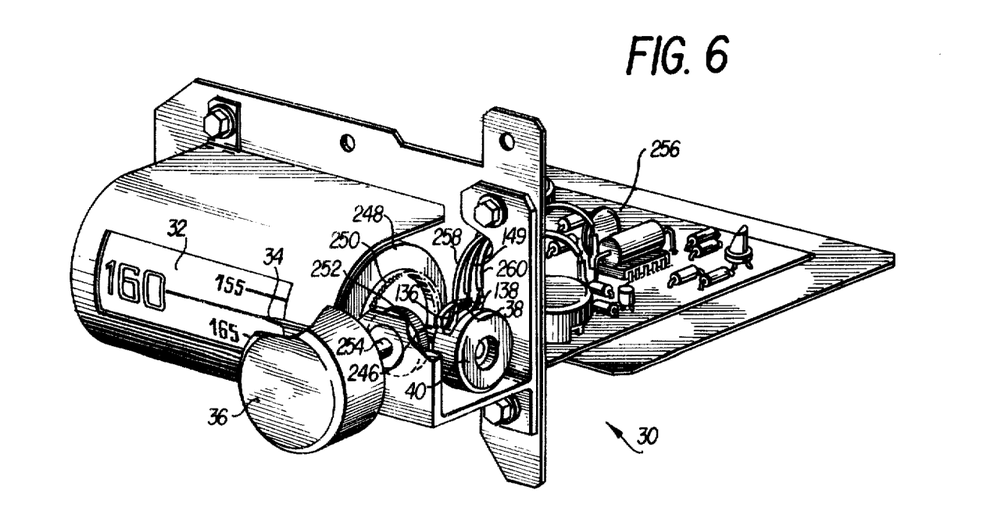
FIG. 6 shows mechanical construction details of the embodiment of the present invention shown in FIG. 2.

Referring now to FIG. 6, there are shown mechanical details of construction of the control assembly 30 which is included in the control panel 28 (FIG. 1). The shaft 246 of the temperature presetting potentiometer 40 is firmly connected to a rotatable cylindrical drum 248 having the temperature presetting scale 32 on the outer surface thereof and to a driven gear 250 for driving the drum 248 and the potentiometer shaft 246. The driven gear 250 is driven at a right angle by a driving gear 252 firmly connected to a control shaft 254 to which the control knob 36 is attached. Circuitry, according to the invention, is mounted in a conventional manner on a printed circuit board 256 which forms the rear of the control assembly 30. Conductors 258, 149 and 260 connect the terminals 136, 38 and 138 of the temperature presetting potentiometer 40 to the circuitry mounted on the printed circuit board 256.

The operation of the preferred embodiment will now be explained. Generally, the apparatus operates to place the output switching means 210 in the second condition and thereby to de-energize the heating means and energize the audible indicator when food temperature as sensed by the thermistor 90 included in the probe 18 (FIG. 1) reaches the preset temperature, the preset temperature being determined by the position of the wiper 38 of the temperature presetting potentiometer 40 (FIGS. 2 and 6).

The temperature responsive voltage divider 98 produces the first voltage at the tap point 104 as an approximately linear direct function of the temperature as sensed by the thermistor 90. Since the first voltage produced at the tap point 104 is a linear function of sensed temperature, the temperature presetting potentiometer 40 can be linear and the temperature presetting scale 32 can have linear graduations.

At the beginning of a cooking cycle, the position of the wiper 38 of the temperature presetting potentiometer 40 is adjusted to set the desired internal temperature to which the food, for example the ham 20, is to be cooked. Initially, the voltage at the wiper 38 is higher than the voltage at the tap point 104. Since the voltage at the inverting input 142, therefore, is less positive than the voltage at the non-inverting input 144, the comparator 140 is in the off condition. When the temperature as sensed by the thermistor 90 reaches or slightly exceeds the preset temperature, the voltage at the inverting input 142 is more positive than the voltage at the non-inverting input 144 and the comparator 140 switches to its on condition, thereby effectively connecting the output 146 to the negative DC supply conductor 54 through the collector-emitter junction of the internal output transistor in the comparator 140 to produce a signal from the first signal-producing means 96.

The capacitor 182 begins to charge through the resistor 180 and the internal output transistor of the comparator 140 up to the voltage across the positive and negative DC supply conductors 52 and 54. When the capacitor 182 has sufficiently charged so that the voltage at the inverting input 206 is less positive than the voltage at the non-inverting input 204, the comparator 202 switches to its off condition. Since the voltage at the tap point 186 and thus the voltage supplied to the non-inverting input 204 increases when the comparator 202 switches to the off condition due to removal of comparator output loading on the tap point 198, the threshold switching point of the comparator 202 shifts, causing the switching action to be regenerative. as a Schmitt trigger. A signal from the third signal producing means 178 is thereby produced, permitting base drive to be supplied from the positive DC supply conductor 52 through the resistors 190, 192 and 194 to the base 212b. The transistor 212 included in the output switching means 210 turns on, the output switching means 210 being placed in the second condition. An output signal from the first signal-producing means 96 which continues for several milliseconds causes the third signal-producing means 178 to produce a signal to place the output switching means 210 in the second condition.

If, on the other hand, due to a transient noise spike, only a momentary signal is produced by the comparator 140, the capacitor 182 would not sufficiently charge and the voltage at the inverting input 206 would not become less positive than the voltage at the non-inverting input 204. The comparator 202 would remain in the on state. When the comparator 202 is in the on state, no base drive is supplied to the base 212 and the output switching means 210 remains in the first condition because the tap point 198 is connected to the negative DC supply conductor 54 through the internal output transistor of the comparator 202.

It will be apparent that there is included protection against both open-circuited and short-circuited conditions in the temperature sensing circuit 88. If either such condition occurs, the apparent sensed temperature falls outside of the expected range of possible sensed temperature. Typically, the expected range is from 32° to 200° F., inclusive. As explained below, when either such condition occurs, the source of microwave energy is de-energized.

The first signal-producing means 96, including the negative temperature coefficient thermistor 90, inherently provides protection against a short-circuited condition in the sensing circuit 88. A short-circuit in parallel with the thermistor 90 would appear to be a very high sensed temperature, above the expected range of sensed temperature, and would cause the voltage at the tap point 104 to be substantially equal to the voltage on the positive DC supply conductor 52. Since the voltage at the inverting input 142 would be much more positive than the voltage at the non-inverting input 144, the comparator 140 would switch to the on condition to produce a signal from the first signal-producing means 96. As a result, the output switching means 210 would be placed in the second condition, thereby deenergizing the heating means.

The second signal-producing means 150 produces a signal, in the form of the on condition of the comparator 166, when the voltage at the tap point 104 is less positive than the second reference voltage, the second reference voltage being representative of the temperature lower than the lowest initial temperature of food to be placed in the oven, and below the expected range of sensed temperature. When the voltage supplied to the non-inverting input 170 from the tap point 104 is less positive than the second reference voltage, which is supplied to the inverting input 168, it indicates that an open-circuited condition exists in the sensing circuit 88. Since the outputs 172 and 146 are connected together, an on condition of the comparator 166 has the same effect as an on condition of the comparator 140. As a result, the output switching means 210 is placed in the second condition, thereby de-energizing the heating means.

Thus, protection against either an open-circuited or a short-circuited condition in the sensing circuit 88 is provided. Such protection is desirable in a conventional oven and particularly desirable in a microwave oven due to the speed of the cooking process in a microwave oven. Without such protection, the ham 20 might cook indefinitely either if an open-circuited or a short-circuited condition occurred in the sensing circuit 88 during a cooking cycle or if the temperature sensing probe 18 were inadvertently left unplugged at the connector 24 when the heating means was initially manually energized. In the latter case, when the present invention is employed, it would be immediately apparent to a user that something was wrong because it would be impossible to energize the heating means and the indicator would immediately be heard.

In order to hold the output switching means 210 in the second condition once it has been placed in the second condition, the latching means 222 produces a feedback signal at the output 230. Since the output 230 is connected in parallel with the outputs 172 and 146, an on condition of the comparator 224 has the same effect as an on condition of the comparator 140, which is to cause the output switching means to be placed (or to remain) in the second condition. When the comparator 202 is in its on condition, indicating that the preset temperature has not yet been reached, the voltage supplied to the inverting input 226 is less than the fourth reference voltage which is supplied to the non-inverting input 228 and the comparator 224 is in its off condition. When the comparator 202 is initially switched to the off condition, indicating that the preset temperature has been reached, base drive is supplied to the base 212b, placing the output switching means in the second condition. Additionally, the voltage at the output 208, and thus the voltage supplied to the inverting input 226, becomes more positive than the voltage supplied to the inverting input 228, and the comparator 224 switches to its on condition, producing the feedback signal. As a result, the output switching means 210 remains in the second condition.

Without such latching means, the heating means might undesirably be re-energized, or the indication means de-energized, if the food temperature were to decrease sufficiently before the user noted that the cooking was completed and removed the food from the oven.

It will be apparent therefore that the present invention provides simplified, effective and straightforward food temperature responsive control apparatus.

While specific embodiments of the invention have been illustrated and described herein, it is realized that modifications and changes will occur to those skilled in the art to which the invention pertains. It is therefore to be understood that the appended claims are intended to cover all such modifications and changes as fall within the true spirit and scope of the invention.

For example, the polarity of the DC supply conductors 52 and 54 could be reversed. With appropriate rearrangement of connections to the comparators 140, 166, 224 and 202 and the substitution of a PNP transistor for the NPN transistor 212, the apparatus would function according to the same principles.

The various reference voltage dividers may take a different form. For example, in order to provide a third reference voltage, a separate reference voltage divider may be provided rather than using the tap point 186 on the voltage divider 198. If high and low-end calibration adjustments are not to be provided, the terminals 136 and 138 of the potentiometer 40 could be connected directly to the positive and negative DC supply conductors 52 and 54.

As mentioned above, the comparators 140, 166, 224 and 202 need not be of the open collector output type, but may be of the active pull-up, pull-down output type. However, if they are of the active pull-up, pull-down output type, blocking diodes must be placed in series with each comparator output.

Additionally, since transient noise is less likely to result from either the second signal-producing means 150 or the latching means 222 because the comparators 166 and 224 do not normally operate near a switching threshold, the integration provided by the resistor 180 and the capacitor 182 in the third signal-producing means 178 is not as important in the case of outputs from the comparators 166 and 224 as it is in the case of an output from the comparator 140. Therefore, the outputs 172 and 230 could be connected directly to the inverting input 206 of the comparator 202, substantially bypassing the resistor-capacitor integration.

The terminal of the capacitor 182 which is connected to the positive DC supply conductor 52 could be connected instead to the negative DC supply conductor 54. In that case, the capacitor 182 would normally be charged and would discharge when the comparator 140 switched to the on condition.

The relay coil 86 might directly be driven by the output 208 of the comparator 202 if a comparator capable of supplying sufficient current was used for the comparator 202.

What is claimed as the invention is:

1. Food temperature responsive control apparatus comprising:
   a. means for sensing the internal temperature of food being cooked in an oven, said sensing means including a sensing circuit having a temperature sensing thermistor;
   b. first signal-producing means connected to said sensing circuit for producing a first signal when the temperature sensed by said thermistor exceeds a preset temperature, and additionally when an electrically short-circuited conditions exists in said sensing circuit, the short-circuited condition effectively short circuiting the terminals of said thermistor;
   c. output switching means capable of being placed in first and second conditions;
   d. second signal-producing means for producing a second signal to place said output switching means in the second condition when the temperature apparently sensed by said thermistor falls outside an expected range of sensed temperatures when an electrically open-circuited condition exists in said sensing circuit;
   e. third signal-producing means for producing a third signal to place said output switching means in the second condition in response to continuation of the first signal for a predetermined length of time; and
   f. latching means for maintaining said output switching means in the second condition once said output switching means has been placed in the second condition.

2. The apparatus of claim 1, wherein said output switching means is adapted to permit energization of a heating means when placed in the first condition and to deenergize the heating means when placed in the second condition.

3. The apparatus of claim 1, wherein said output switching means is adapted to energize an indication means when placed in the second condition.

4. The apparatus of claim 1, wherein said sensing means comprises a probe adapted for insertion into the food and wherein said thermistor has a negative temperature coefficient and is included within the probe housing.

5. The apparatus of claim 4, wherein said first signal-producing means comprises:
   a. means for developing a first voltage as an inverse function of the resistance of said sensing circuit.
   b. means for developing a first reference voltage representative of and directly related to a preset temperature; and
   c. comparator means responsive to the first voltage and the first reference voltage to produce said first signal when the first voltage exceeds the first reference voltage.

6. The apparatus of claim 5, wherein
   said thermistor has a non linear resistance versus temperature characteristic;
   said means for developing a first voltage includes means for compensating for the non-linear characteristic of said thermistor to develop the first voltage as an approximately linear direct function of the temperature sensed by said thermistor; and
   said means for developing a first reference voltage comprises a voltage divider including a manually adjustable potentiometer having a linear resistance versus mechanical displacement characteristic.

7. the apparatus of claim 6, wherein said apparatus further comprises first and second DC supply conductors for connection to a source of DC voltage; and
   said means for developing a first voltage is a voltage divider comprising:
   a. first and second terminals for connection to said first and second supply conductors, respectively;
   b. a tap point intermediate said first and second terminals, said first voltage being developed at said tap point;
   c. means for connecting said sensing circuit between said tap point and said first terminal to electrically include said thermistor in said voltage divider, there being between said tap point and said first terminal substantially no other resistance either directly in series or directly in parallel with said thermistor; and
   d. a fixed resistor connected between said tap point and said second terminal, said fixed resistor having a resistance value selected to provide a voltage divider characteristic which combines with the thermistor characteristic so that the first voltage is an approximately linear function of the temperature sensed by the thermistor.

8. The apparatus of claim 6, wherein
   said means for developing a first reference voltage further comprises:
   a. a high-end calibration voltage divider for producing at the tap point thereof a voltage representative of a highest temperature to be preset; and
   b. a low-end calibration voltage divider for producing at the tap point thereof a voltage representative of a lowest temperature to be preset; and
   c. wherein said potentiometer includes high and low-end terminals, and a mechanically movable wiper, said high-end terminal being connected to the tap point of said high-end calibration voltage divider, said low-end terminal being connected to the tap point of said low-end calibration voltage divider, and said first reference voltage is developed at said wiper.

9. The apparatus of claim 5 which further comprises a source of a second reference voltage which is less than a voltage representative of a temperature lower than the lowest initial temperature of food to be placed in the oven; and wherein said second signal-producing means comprises comparator means responsive to the first voltage and the second reference voltage to produce a signal when the first voltage is less than the second reference voltage.

10. The apparatus of claim 3, wherein said third signal-producing means comprises:

a. a capacitor capable of first and second states of charge;

b. a resistor, one terminal of said resistor being connected to a terminal of said capacitor and the other terminal of said resistor being connected to receive the first signal;

c. a source of a third reference voltage which is intermediate the voltage on said capacitor when said capacitor is in said first state of charge and the voltage on said capacitor when said capacitor is in said second state of charge; and d. comparator means responsive to the voltage on said capacitor and the third reference voltage to produce the third signal when said capacitor changes from the first to the second state of charge.

11. The apparatus of claim 3, which further comprises a source of a fourth reference voltage which is greater than the voltage required to be supplied to said output switching means to place said output switching means in the first condition and which is less than the voltage required to be supplied to said output switching means to place said output switching means in the second condition; and wherein said latching means comprises comparator means responsive to the fourth reference voltage and the voltage supplied to said output switching means to produce a signal when the voltage supplied to said output switching means exceeds the fourth reference voltage.

12. The apparatus of claim 3, wherein said output switching means comprises a transistor including base and collector terminals and a relay coil connected in circuit with said collector terminal, said relay coil being energized in response to a voltage being provided to said base terminal by the third signal-producing means.

* * * * *